E. E. WINKLEY.
METHOD OF MAKING HEELS.
APPLICATION FILED APR. 1, 1915. RENEWED APR. 24, 1918.

1,285,534.

Patented Nov. 19, 1918.
2 SHEETS—SHEET 1.

Witness
Frederick S. Greenleaf.

Inventor
Erastus E. Winkley
by his attorneys
Phillips, Van Everen & Fish

UNITED STATES PATENT OFFICE.

ERASTUS E. WINKLEY, OF LYNN, MASSACHUSETTS, ASSIGNOR, BY MESNE ASSIGN-
MENTS, TO UNITED SHOE MACHINERY CORPORATION, OF PATERSON, NEW JERSEY,
A CORPORATION OF NEW JERSEY.

METHOD OF MAKING HEELS.

1,285,534.          Specification of Letters Patent.      Patented Nov. 19, 1918.

Application filed April 1, 1915, Serial No. 18,495. Renewed April 24, 1918. Serial No. 230,606.

*To all whom it may concern:*

Be it known that I, ERASTUS E. WINKLEY, a citizen of the United States, residing at Lynn, in the county of Essex and State of Massachusetts, have invented certain new and useful Improvements in Methods of Making Heels; and I do hereby declare the following to be a full, clear, and exact description of the invention, such as will enable others skilled in the art to which it appertains to make and use the same.

This invention relates to a method of making heels and, as incidental to the method of making heels, a method of making the heel-lifts of which the heels are composed. The method is an exemplification of the general method of making heels disclosed in United States Letters Patent No. 1,121,702, granted to John C. Smith and myself, December 22, 1914, this method, in general, being characterized by the production and utilization of heel-lifts of polygonal form produced by a series of straight cuts in the sheet-material of which the lifts are composed, as distinguished from the usual method of making heels, in which heel-lifts of rounded outline are produced by a dieing-out operation.

The object of the present invention is to produce heels from a pile of polygonal heel-lifts which shall sufficiently approximate their final rounded form to permit the convenient use of a shaping machine to round off the angles, but which shall be formed by the minimum practicable number of straight cuts, and to this end I contemplate the production of heel-lifts of a pentagonal form, the back edge of each lift being formed by two cuts arranged at an obtuse angle and meeting at the middle of the back, while the side edges of each lift are produced by two other straight cuts, preferably parallel.

I contemplate producing such lifts by subjecting a sheet of material repeatedly, and progressively, to a cutting operation by which a plurality of angularly arranged straight cuts are produced in the material, each of these cutting operations serving to sever and complete one or more heel-lifts and, at the same time, to partially form one or more other lifts.

After a number of lifts, of different sizes, have been cut in this manner a plurality of them, all of the same size for a "straight" heel or of varying sizes for a "military", or the like, heel, are assembled in a pile suitably secured together in such relation that their straight, breast edges are alined in the same plane, thereafter the heel-block thus formed is subjected to a shaping operation to round off the back corners and bring the lateral surface of the block to the desired contour preparatory to the heel-compressing operation which produces from the block a commercial shaped heel-block.

The invention consists in the method of making heels, the preferred manner of practising which is hereinafter described and defined in appended claims.

The invention will most readily be understood by a reference to the accompanying drawings, illustrating the preferred manner of practising the invention, in which.

It is common to speak of the several pieces or layers of material from which a laminated heel is built up as "heel-lifts," whether these pieces be in their original rough condition, or in the shaped condition in which they are found in a shaped heel-block, or in the shapes and compressed condition in which they are found in the finished heel-blank or heel, and in this specification it may be understood that the term "heel-lift" is used indiscriminately in its widest sense, unless modified by express limitations. It may also be understood that the term "heel" is used indiscriminately herein to apply not only to a completed heel, or a compressed heel-block, but also to a heel-block whether shaped or unshaped.

Figure 1:
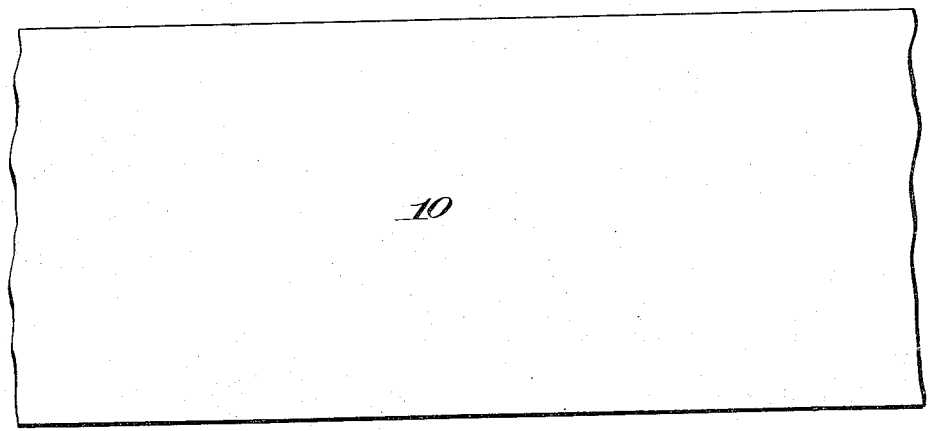
Figure 1 is a plan of a strip of sheet-material suitable for use in the present method.
Figure 2:
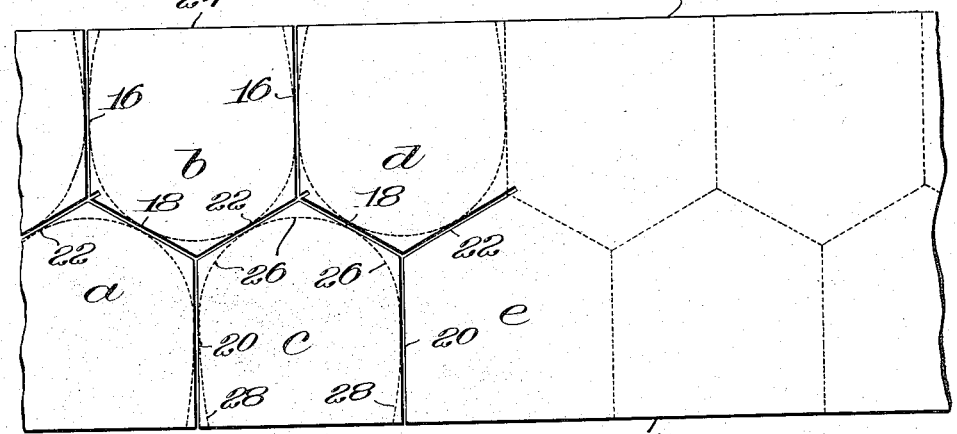
Fig. 2 is a plan of similar sheet partially divided into pentagonal heel-lifts.

In the preferred method of practising the invention, the strip of material shown in Figs. 1 and 2 which may be either leather leatherboard or any other material suitable for making heel-lifts, is preliminarily stripped to a width just sufficient to produce two rows of lifts of any preselected size arranged back to back, so that the lateral edges 12 and 14 of the strip produce the breast-edges of the lifts without any operation except that by which the breast of the heel-block may be ultimately finished. As shown in Fig. 2 the heel-lifts $a$, $b$, $c$, etc., are cut from the strip 10 in a staggered relation, and are pentagonal in form, the back of each lift being formed by two straight cuts, 18 and 22, which meet, at an obtuse angle, conveniently in the middle of the back, while the side-edges of each lift are formed also by two straight cuts 16 which are parallel. Owing to the staggered relation of the lifts the same cuts which form the back-edge of one lift may partially form the back-edges of two adjacent lifts in the opposite row, while each cut 16 forms the side-edges of two adjacent lifts in the same row. From this arrangement of cuts it results that no waste-pieces are left between the lifts to interfere with the cutting operation.

Figure 3:
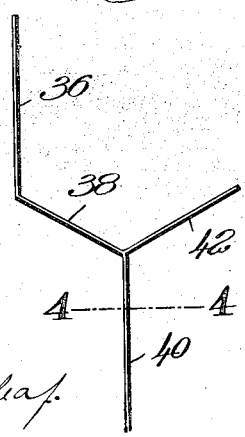
Fig. 3 is a plan of a knife suitable for use in carrying out the present method.
Figure 4:
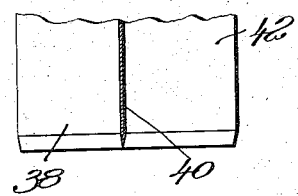
Fig. 4 is a sectional view, on the line 4—4 of Fig. 3, looking upwardly in the latter figure.

The cuts above described may be made either singly, or in any required number and combination simultaneously, but in Figs. 3 and 4 I have shown a knife of a form such that, if this knife be employed to subject the strip 10 to repeated and progressive cutting operations, each operation of the knife will complete the formation of two lifts and sever them from the strip. This knife comprises two straight edges 36 and 40 adapted to produce the cuts by which the side-edges of the lifts are formed, and two other straight edges 38 and 42 which make the cuts by which the back-edges of the lifts are formed. The knife may be supported and actuated by any suitable mechanism by which it may be forced into and through the sheet-material and by which a relative feeding movement of the material and knife may be produced. The edge 42 is preferably slightly longer than the edge 38, so as to insure that the cut produced by it shall, in each instance, meet the cuts produced by the edges 36 and 38, and the edges 36 and 40 may be made somewhat longer than is necessary to reach the edges 12 and 14 of the strip 10, so as to insure that the cuts shall pass completely through these edges regardless of any slight inaccuracy in the presentation of the knife to the work.

Figure 5:
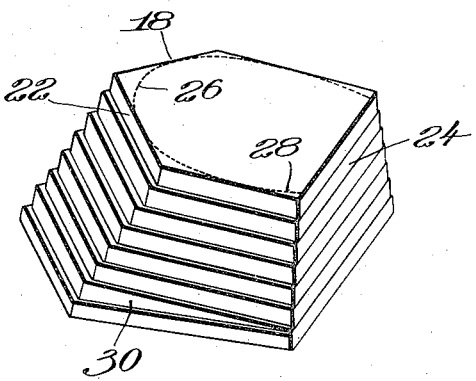
Fig. 5 is a perspective of a heel-block formed in accordance with the present method.

The pentagonal heel-lifts produced as above described are only approximately of the form which the lifts have in the finished heel, since it is necessary, in order to complete these lifts, to round off three of the angles so as to produce a curved contour. In building "military" and like heels from these lifts I consider it preferable to first assemble a graded series of the lifts, in their pentagonal form, as shown in Fig. 5, by pasting, or otherwise fastening, the lifts together in the general form of a truncated pyramid. In addition to the ordinary lifts, for the purpose of producing wedge heels a wedge-shaped pentagonal lift 30 may also be introduced to the heel-block at this time, as shown in Fig. 5. After so assembling the lifts in a block the block as a whole may be shaped on its peripheral surface, thus shaping the several lifts to the lines 26 and 28. The lifts are preferably assembled in the heel-block with the breast edges 24 all in the same plane, as shown in Fig. 5, so as to provide a vertical breast that may be treated in any manner deemed necessary thereafter.

Figure 6:
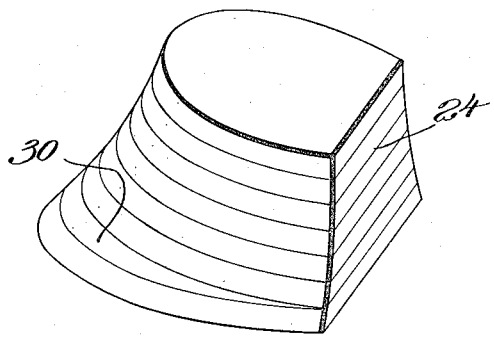
Fig. 6 is a perspective showing the heel-block after it has been shaped.
Figure 7:
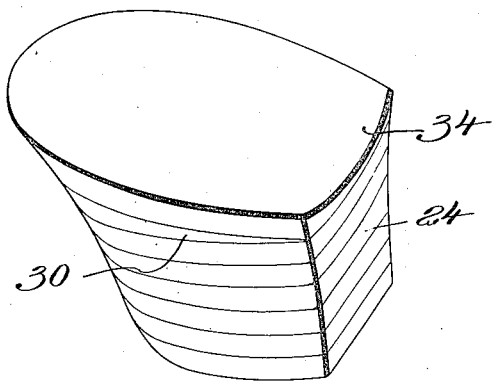
Fig. 7 is a perspective of a heel-blank formed from the block of Fig. 6 by the operation of the usual heel-compressor.

After the operation by which the heel-block is shaped as in Fig. 6, which is preferably accomplished by a shaving cut from breast corner to breast corner, performed by the machine of my United States Patent No. 1,102,310, dated July 7, 1914, it is compressed in the usual manner, so as to compact the material and form a concave heel-seat 34 as shown in Fig. 7, thus producing a commercial heel-blank.

While the novel method of the present invention may be carried out, as above described, in such a manner that each heel-lift is brought to a pentagonal form before the several lifts or thicknesses of material are assembled to form a heel, it is not intended, by this description, to exclude, from the definition of the invention, the use of any series of operations of which pentagonal heel-lifts are the ultimate result, whether these lifts are first brought to this form before or after the thicknesses of material are assembled in a block or heel.

Having thus described the invention and the preferred method of practising it, the invention is definitely stated in its true scope in the following claims.

What is claimed as new, is:—

1. That method of making heels which consists in producing a plurality of pentagonal lifts by interlocking straight line cuts in sheet material; assembling a plurality of such lifts and securing them together in a heel-block; and shaping the lateral surface of the heel-block to a curved contour by shaving off three consecutive corners of the several pentagons.

2. That method of making heels which consists in producing a plurality of pentagonal lifts of different sizes from sheet material; assembling and securing together a series of such lifts graded as to size to produce a heel-block in the form of a truncated pyramid having one vertical side; and shaping the sides of said pyramid opposite the vertical side to a curved contour.

3. That method of making heels which consists in subjecting sheet material repeatedly and progressively to a cutting operation by which a plurality of angularly arranged straight cuts are produced in the material, each of the cutting operations serving to sever and complete one or more pentagonal heel lifts; securing a plurality of such lifts in a pile with a corresponding straight edge on each lift alined in the same plane to form the heel breast; and shaping the lateral surface of the heel block thus produced to a curved contour at the back.

ERASTUS E. WINKLEY.